United States Patent [19]

Saeki et al.

[11] Patent Number: 4,824,905

[45] Date of Patent: Apr. 25, 1989

[54] THERMOPLASTIC RESIN COMPOSITION COMPRISING POLYAMIDE, AROMATIC VINYL/UNSATURATED NITRILE/RUBBERY POLYMER GRAFT COPOLYMER AND AROMATIC VINYL/UNSATURATED NITRILE/α-UNSATURATED CARBOXYLIC ACID COPOLYMER

[75] Inventors: Tadashi Saeki; Kiyoshi Ikawa; Seiji Kurita; Katsuji Ueno, all of Niihama, Japan

[73] Assignee: Sumitomo Naugatuck Co., Ltd., Osaka, Japan

[21] Appl. No.: 154,276

[22] Filed: Feb. 10, 1988

[30] Foreign Application Priority Data

Feb. 13, 1987 [JP] Japan .................................. 82-31241
Oct. 5, 1987 [JP] Japan .................................. 82-251913

[51] Int. Cl.$^4$ .............................................. C08L 77/00
[52] U.S. Cl. ........................................ 525/66; 525/179
[58] Field of Search .................................. 525/66, 179

[56] References Cited

U.S. PATENT DOCUMENTS 4,713,415 12/1987 Lavengood et al. ................. 525/66

Primary Examiner—Lewis T. Jacobs
Assistant Examiner—A. Carrillo

[57] ABSTRACT

A thermoplastic resin composition comprising:

(A) polyamide have a relative viscosity in sulfuric acid of not less than 2.0 and less than 3.0, (B) a graft copolymer which is obtainable by copolymerizing an aromatic vinyl monomer, a cyanated vinyl monomer and other vinyl monomer copolymerizable with the former two monomers in the presence of a rubbery polymer and (C) a carboxylic acid-modified copolymer comprising monomeric units derived from an aromatic vinyl monomer, a cyanated vinyl monomer and an $\alpha,\beta$-unsaturated monocarboxylic acid wherein the weight ratio of polyamide (A) to the total amount of the graft copolymer (B) and the carboxylic acid-modified copolymer (C) is from 90:10 to 10:90, the content of $\alpha,\beta$-unsaturated monocarboxylic acid is 0.1 to 1.5% by weight based on the total amount of the graft copolymer (B) and the carboxylic acid-modified copolymer (C), and the content of rubbery polymer is 5 to 30% by weight based on the whole weight of the composition. Specific compositions include, for example, those where (A) is nylon 6 or nylon 66, (B) is styrene and acrylonitrile copolymerized in the presence of polybutadiene, polybutyl acrylate latex or EPDM and (C) is made up of units derived from styrene, acrylonitrile and methacrylic acid.

4 Claims, No Drawings

THERMOPLASTIC RESIN COMPOSITION COMPRISING POLYAMIDE, AROMATIC VINYL/UNSATURATED NITRILE/RUBBERY POLYMER GRAFT COPOLYMER AND AROMATIC VINYL/UNSATURATED NITRILE/α-UNSATURATED CARBOXYLIC ACID COPOLYMER

BACKGROUND OF THE INVENTION

1. Field of the Invention

The present invention relates to a thermoplastic resin composition. More particularly, it relates to a composite type thermoplastic resin composition which comprises polyamide, a specific graft polymer and a specific copolymer modified with an unsaturated carboxylic acid and has well balanced impact strength (namely notched izod impact strength), moldability and tensile strength, and weld strength as well as appearance.

2. Description of the Prior Art

Polyamide resins are excellent in moldability, heat resistance, mechanical strength, chemical resistance and wear resistance and widely used as materials of, for example, machine parts, electric and electrical parts and automobile parts. However, they suffer from decrease of impact strength in a dry state, and dimensional change and/or decrease of tensile strength due to moisture absorption.

As typical impact resistant rubber-modified resins, acrylonitrile-butadiene-styrene (ABS) resins, AES resins comprising ABS resins a rubber component of which is replaced with ethylene-propylene base rubber and AAS resins comprising ABS resins a rubber component of which is replaced with acrylic rubber are known and widely used as materials of automobile parts, electrical equipment parts, business machine parts. Although these resins are excellent in impact strength and dimensional stability, they usually have relatively poor chemical resistance, and a high impact grade which contains the rubber component in an increased content has decreased tensile strength and moldability.

To overcome the above drawbacks, it was proposed to melt mix polyamide with the ABS resin (cf. Japanese Patent Publication No. 23476/1963). However, since the compatibility between polyamide and the ABS resin is inherently bad, a molded article suffers from delamination and provides an article having low impact strength.

It has been proposed to introduce a functional group having reactivity or affinity with polyamide such as carboxylic acid group and an amide group in the ABS resin so as to modify the ABS resin and to increase the compatibility between polyamide and the ABS resin (cf Japanese Patent Kokai Publication Nos. 11159/1979, 32656/1983 and 93745/1983). However, the introduction of such functional group into the ABS resin may result in great decrease of moldability and unsatisfactory improvement of impact strength. Further, an article molded from the mixed resin has less weld strength (strength along a weld-line).

SUMMARY OF THE INVENTION

An object of the present invention is to provide a thermoplastic resin composition comprising a polyamide resin and an ABS resin, which has good moldability and provides a molded article having balanced impact strength and tensile strength and good weld strength.

According to the present invention, there is provided a thermoplastic resin composition comprising:

(A) polyamide having a relative viscosity in sulfuric acid of not less than 2.0 and less than 3.0, (B) a graft copolymer which is obtainable by copolymerizing 50 to 90% by weight of an aromatic vinyl monomer, 10 to 50% by weight of a cyanated vinyl monomer and 0 to 40% by weight of other vinyl monomer copolymerizable with the former two monomers in the presence of a rubbery polymer and (C) a carboxylic acid-modified copolymer comprising monomeric units derived from 50 to 89.5% by weight of an aromatic vinyl monomer, 10 to 49.5% by weight of a cyanated vinyl monomer and 0.5 to 20% by weight of an $\alpha,\beta$-unsaturated monocarboxylic acid wherein the weight ratio of polyamide (A) to the total amount of the graft copolymer (B) and the carboxylic acid-modified copolymer (C) [A:(B+C)] is from 90:10 to 10:90, the content of $\alpha,\beta$-unsaturated monocarboxylic acid is 0.1 to 1.5% by weight based on the total amount of the graft copolymer (B) and the carboxylic acid-modified copolymer (C), and the content of rubbery polymer is 5 to 30% by weight based on the whole weight of the composition.

DETAILED DESCRIPTION OF THE INVENTION

Polyamide (A)

Examples of the polyamide (A) are polyamides prepared from aliphatic, alicyclic or aromatic diamines (e.g. ethylene diamine, diaminobutane, hexamethylenediamine, decamethylenediamine, dodecamethylenediamine, 2,2,4- and 2,4,4-trimethylhexamethylenediamine, 1,3- and 1,4-bis(aminomethyl)cyclohexane, bis(p-aminocyclohexyl)methane, m-xylylenediamine, p-xylylenediamine, etc.) and aliphatic, alicyclic or aromatic dicarboxylic acids (e.g. adipic acid, suberic acid, sebacic acid, cyclohexanedicarboxylic acid, terephthalic acid, isophthalic acid, etc.); polyamides prepared by ring opening polymerization of lactams (e.g. ε-caprolactam, ω-dodecalactam, etc); polyamides prepared from 6-aminocaproic acid, 11-aminoundecanoic acid, 12-aminododecanoic acid and the like; and copolymerized or mixed polyamide thereof.

Because of mass and economical production, preferred are polycaproamide (nylon 6), polydodecamide (nylon 12), polytetrametyleneadipamide (nylon 46), polyhexamethyleneadipamide (nylon 66), polyhexamethylenesebacamide (nylon 610), copolymeric polyamides thereof (e.g. nylon 6/66, nylon 6/610), nylon 6/12, nylon 66/12, nylon 6/66/610/12) and mixtures thereof. Also preferred is a bis(p-amionocyclohexyl)methane/terephthalic acid/isophthalic acid base polyamide.

The polyamide (A) to be used according to the present invention has a relative viscosity in sulfuric acid (a solution of 1 g of polyamide in 100 ml of 98% sulfuric acid at 25° C.) of not smaller than 2.0 and smaller than 3.0. When the relative viscosity in sulfuric acid is less than 2.0, or 3.0 or larger, the molded article has decreased weld strength. Preferably, the polyamide (A) has a relative viscosity in sulfuric acid of from 2.2 to 2.8.

The molecular structure of the polyamide (A) is not critical and may be a linear or branched polyamide. The linear polyamide may be prepared by a per se conventional method, while the branched polyamide is prepared by polymerizing the monomer(s) in the presence of a small amount of a polyfunctional branching agent having at least three polyamide-formable functional groups (e.g. bis(ω-aminohexyl)amine, diethylenetriamine, trimesic acid, bislactam, etc.). Polymerization may be carried out in various manners such as melt polymerization, interfacial polymerization, solution polymerization, bulk polymerization, solid phase polymerization and combinations thereof. Generally, melt polymerization is suitable. When a monomer is a lactam, the polyamide can be prepared by anionic polymerization.

As the rubbery polymer to be used in the preparation of the graft copolymer (B), exemplified are diene base rubbery polymers (e.g. polybutadiene, butadiene-styrene copolymer, butadiene-acrylonitrile copolymer, etc.) and non-conjugated diene base rubbery polymers (e.g. ethylene-propylene copolymer, ethylene-propylene-non-conjugated diene copolymer, acrylic rubbery polymer, chlorinated polyethylene, etc.) and mixtures thereof. The rubbery polymer may be prepared by a conventional polymerization method such as emulsion polymerization, solution polymerization, bulk polymerization and suspension polymerization. When the emulsion polymerization is employed, there is no limitation on a particle size and gel content of the rubbery polymer. Preferably, the rubbery polymer has a particle size of 0.1 to 1 μm and a gel content of 0 to 95%.

Examples of the aromatic vinyl monomer are styrene, α-methylstyrene, o-methylstyrene, m-methylstyrene, p-methylstyrene, t-butylstyrene, α-methylvinyltoluene, dimethylstyrene, chlorostyrene, dichlorostyrene, bromostyrene, dibromostyrene, vinylnaphthalene and mixtures thereof. Among them, styrene is most preferred.

Examples of the cyanated vinyl monomer are acrylonitrile, methacrylonitrile, and mixtures thereof. Among them, acrylonitrile is most preferred.

Examples of other vinyl monomer copolymerizable with the aromatic vinyl monomer and the cyanated vinyl monomer are alkyl esters of unsaturated carboxylic acids (e.g. methyl acrylate, ethyl acrylate, butyl acrylate, 2-ethylhexyl acrylate, methyl methacrylate, ethyl methacrylate, propyl methacrylate, 2-ethylhexyl methacrylate, etc.), maleimide compounds (e.g. maleimide, N-phenylmaleimide, N-methylmaleimide, N-cyclohexylmaleimide, etc.) and mixtures thereof.

The gaft copolymer (B) is prepared by copolymerizing a monomer mixture comprising 50 to 90% by weight of the aromatic vinyl monomer, 10 to 50% by weight of the cyanated vinyl monomer and 0 to 40% by weight of at least one other vinyl monomers copolymerizable with the former two monomers in the presence of the rubbery polymer.

A weight ratio of the monomer mixture to the rubbery polymer in the graft copolymer is not critical. Preferably, the graft copolymer comprises 20 to 80% by weight of the rubbery polymer and 80 to 20% by weight of the monomer mixture.

When the monomeric composition of the graft copolymer (B) is outside the above ranges, the compatibility between the graft copolymer (B) and the carboxylic acid-modified copolymer (C) is so poor that the molded article made from the resin composition has decreased impact strength.

The graft copolymer may have any degree of grafting. Usually, the degree of grafting is from 20 to 100%.

As the graft polymerization method, any of conventional methods such as emulsion, suspension, solution and bulk polymerization may be employed.

The carboxylic acid-modified copolymer (C) is (i) a copolymer prepared by copolymerizing aromatic vinyl monomer, cyanated vinyl monomer and α,β-unsaturated monocarboxylic acid or (ii) a copolymer mixture consisting of the above copolymer (i) and a copolymer prepared by copolymerizing 50 to 90% by weight of aromatic vinyl monomer and 50 to 10% by weight of cyanated vinyl monomer. Each of the copolymers (i) and (ii) has an average composition of 50 to 89.5% by weight of the aromatic vinyl monomer, 10 to 49.5% by weight of the cyanated vinyl monomer and 0.5 to 20% by weight of the α,β-unsaturated monocarboxylic acid.

When the monomeric composition of the carboxylic acid-modified copolymer (C) is outside these ranges, the resin composition has decreased moldability or impact strength.

Examples of the aromatic vinyl monomer and the cyanated vinyl monomer which constitute the carboxylic acid-modified copolymer (C) are the same as those used in the preparation of the graft copolymer (B).

Examples of the α,β-unsaturated monocarboxylic acid are acrylic acid, methacrylic acid and mixtures thereof.

As described above, the resin composition of the present invention contains, as one of the essential components, the carboxylic acid-modified copolymer comprising the α,β-unsaturated monocaboxylic acid. An unmodified copolymer of the aromatic vinyl monomer and the cyanated vinyl monomer or an aromatic vinyl monomer/cyanated vinyl monomer copolymer modified with other modifiers such as anhydrides of dicarboxylic acids or esters of the α,β-unsaturated carboxylic acid does not achieve the object of the present invention of providing a resin composition having good impact strength, moldability, tensile strength and weld strength.

The carboxylic acid-modified copolymer (C) may be prepared by any of the conventional polymerization methods such as emulsion, suspension, solution and bulk polymerization as well as combinations thereof. The α,β-unsaturated monocarboxylic acid may be added to a polymerization system in any manner. It can be mixed with other monomers and added to the polymerization system, or added to the polymerization system in the form of an aqueous solution.

The resin composition contains the polyamide (A), the graft copolymer (B) and the carboxylic acid-modified copolymer (C) in such mixing ratio that the weight ratio of the polyamide (A) to the total amount of the graft copolymer (B) and the carboxylic acid-modified copolymer (C) [A:(B+C)] is from 90:10 to 10:90. Further, the content of α,β-unsaturated monocarboxylic acid is from 0.1 to 1.5% by weight based on the total amount of the graft copolymer (B) and the carboxylic acid-modified copolymer (C), and the content of the rubbery polymer is 5 to 30% by weight based on the whole weight of the resin composition.

When the content of the polyamide (A) is less than 10 parts by weight or more than 90 parts by weight, the resin composition cannot achieve well balanced impact strength and tensile strength. Considering weld strength and appearance of the molded article, the weight ratio of polyamide (A) to the total amount of the graft copolymer (B) and the carboxylic acid-modified copolymer (C) is preferably from 90:10 to 30:70.

When the content of α,β-unsaturated monocarboxylic acid is less than 0.1% by weight based on the total amount of the graft copolymer (B) and the carboxylic acid-modified copolymer (C), the compatibility of the two copolymers (B) and (C) with the polyamide (A) is poor so that the impact strength of the molded article decreases, while when the content is more than 1.5% by weight, the moldability of the resin composition and weld strength and appearance of the molded article undesirably decrease.

When the content of rubbery polymer is less than 5% by weight based on the whole weight of the resin composition, the molded article has decreased impact strength, while when it is more than 30% by weight, the molded article has significantly decreased tensile strength. Considering balanced impact strength, tensile strength and moldability, the content of rubbery polymer is preferably from 10 to 25% by weight based on the whole weight of the resin composition.

The polyamide (A), the graft copolymer (B) and the carboxylic acid-modified copolymer (C) can be mixed in any form in any order. These components can be mixed in the form of powder, pellets or the like by simultaneously mixing them or by premixing two of them and then mixing the premixed components with the remaining one component. For melt mixing, any conventional means such as a Banbury mixer, rolls and an extruder can be used.

The resin composition of the present invention may contain a conventionally used additive such as an antioxidant, an ultraviolet-light absorbing agent, a light stabilizer, an antistatic agent, a lubricant, a dye, a pigment, a plasticizer, a flame retardant, a mold release agent, a reinforcing material such as glass fiber, metal fiber, carbon fiber or metal flake. Further, the resin composition of the present invention may contain other thermoplastic resin (e.g. polyacetal, polycarbonate, polybutylene terephthalate, polyethylene terephthalate, polyphenyleneoxide, polymethyl methacrylate, polyvinyl chloride, etc.)

PREFERRED EMBODIMENTS OF THE INVENTION

The present invention will be illustrated by following examples, in which "parts" and "%" are by weight unless otherwise indicated.

PREPARATION EXAMPLE 1

(Graft copolymer (B))

Graft copolymer B-1

In the presence of polybutadiene latex having an average particle size of 0.45 μm and a gel content of 83% (60 parts, as the solid material), acrylonitrile (12 parts) and styrene (28 parts) were polymerized in an aqueous emulsion at 65° C. for 5 hours to obtain an ABS graft copolymer latex (degree of grafting: 35%, intrinsic viscosity of free acrylonitrile/styrene copolymer (measured in dimethylformamide at 30° C.): 0.33 dl/g).

Graft copolymer B-2

In the same manner as in the preparation of the graft copolymer B-1 but using 50 parts of polybutadiene, 15 parts of acrylonitrile and 35 parts of styrene, emulsion polymerization was carried out to obtain an ABS graft copolymer latex (degree of grafting: 55%, intrinsic viscosity of free acrylonitrile/styrene copolymer: 0.58 dl/g).

Graft copolymer B-3

In the presence of cross-linked polybutyl acrylate latex having an average particle size of 0.3 μm (50 parts, as the solid material), acrylonitrile (15 parts) and styrene (35 parts) were polymerized in an aqueous emulsion at 65° C. for 5 hours to obtain an AAS graft copolymer latex (degree of grafting: 50%, intrinsic viscosity of free acrylonitrile/styrene copolymer: 0.72 dl/g).

Graft copolymer B-4

In the presence of ethylene/propylene/ethylidenenorbornene (EPDM) having an iodine value of 21, Mooney viscosity 75 and propylene content of 50%, acrylonitrile and styrene were polymerized in a mixed solvent of n-hexane and ethylene dichloride (weight ratio of 3:2) at 67° C. for 10 hours to obtain an AES graft copolymer consisting of 50% of EPDM, 15% of acrylonitrile and 35% of styrene (degree of grafting: 52%, intrinsic viscosity of free acrylonitrile/styrene copolymer: 0.60 dl/g).

To each of the graft copolymers B-1, B-2 and B-3, 1 part an antioxidant (Sumilizer (a trade mark) NW manufactured by Sumitomo Chemical Co.) and 2 parts of trisnonylphenyl phosphite based on the solid content of the latex were added. The mixture was salted out with magnesium sulfate to separate and recover the graft copolymer. The graft polymer B-4 latex was poured in methanol to precipitate the graft copolymer followed by recovering.

PREPARATION EXAMPLE 2

(Carboxylic acid-modified copolymer (C))

Copolymer C-1

In a reactor which had been purged with nitrogen, pure water (120 parts) and potassium persulfate (0.3 part) were charged and heated to 65° C. with stirring. Then, a monomer mixture of acrylonitrile (30 parts), styrene (70 parts) and t-dodecylmercaptan (0.3 part) and an aqueous emulsifier solution (30 parts) containing sodium dodecylbenzenesulfonate (2 parts) were continuously added over 5 hours. Thereafter, the polymerization system was heated to 70° C. and aged at that temperature for 3 hours to obtain a copolymer having the intrinsic viscosity (in dimethylformamide at 30° C.) of 0.68 dl/g.

Copolymer C-2

In the same manner as in the preparation of the copolymer C-1 but using acrylonitrile (30 parts), styrene (65 parts) and methacrylic acid (5 parts), polymerization was carried out to obtain a copolymer having the intrinsic viscosity of 0.69 dl/g.

Copolymer C-3

In the same manner as in the preparation of the copolymer C-1 but using acrylonitrile (30 parts), styrene (60 parts) and methacrylic acid (10 parts), polymerization was carried out to obtain a copolymer having the intrinsic viscosity of 0.69 dl/g.

Copolymer C-4

In the same manner as in the preparation of the copolymer C-1 but using acrylonitrile (30 parts), styrene (55 parts) and methacrylic acid (15 parts), polymerization was carried out to obtain a copolymer having the intrinsic viscosity of 0.70 dl/g.

Copolymer C-5

In the same manner as in the preparation of the copolymer C-1 but using acrylonitrile (25 parts), styrene (50 parts) and methacrylic acid (25 parts), polymerization was carried out to obtain a copolymer having the intrinsic viscosity of 0.70 dl/g. Each of the copolymers C-1 to C-5 was salted out with calcium chloride and then recovered.

The relative viscosities in sulfuric acid of the polyamide (A) used in Examples are as follows:

| Polyamide | Relative viscosity |
|---|---|
| A-1: Nylon 6 | 1.8 |
| A-2: Nylon 6 | 2.4 |
| A-3: Nylon 6 | 2.8 |
| A-4: Nylon 6 | 3.2 |
| A-5: Nylon 6 | 3.5 |
| A-6: Nylon 66 | 2.6 |
| A-7: Nylon 66 | 3.0 |

[EXAMPLES]

The polyamide (A), the graft copolymer (B) prepared in Preparation Example 1 and the carboxylic acid-modified copolymer (C) prepared in Preparation Example 2 were mixed in a composition shown in Tables 1–6 and melt mixed and pelletized by a twin-screw extruder having a diameter of 40 mm.

The mixing temperature was 250° C. in case of nylon 6 and 280° C. in case of nylon 66.

Physical properties of the resin composition were measured as follows and are shown in Tables 1–6:

Impact strength (notched Izod impact strength)

Impact strength is measured according to ASTM D-256.

Weld strength (falling ball impact test)

By using a mold having two gates, a test piece (60 mm×60 mm×3.18 mm) having a weld line is molded. A dart is placed on the test piece, and a steel ball was freely fallen on the dart. The results are expressed in terms of the minimum energy required for breaking the test piece.

Moldability (flowability)

Flowability of the resin composition is measured by using a KOKA-type flow tester under following conditions:

Composition containing nylon 6
250° C., 60 kg/cm$^2$
Composition containing nylon 66
270° C., 60 kg/cm$^2$ Tensile strength Tensile strength is measured according to ASTM D-638.

Appearance

An article (150 mm×150 mm×3.18 mm) is molded from the resin composition and its appearance is visually evaluated according to following criteria:

O: A surface has no uneven gloss and is uniform.
Δ: A surface has slight uneven gloss and irregularty.
X: A surface has severely uneven gloss and irregularity.

A test piece used in the measurement of impact strength, tensile strength and appearance was prepared by using 3.5 ounce injection molding machine at a cylinder temperature of 250° C. in the case of nylon 6 or 280° C. in the case of of nylon 66.

EXAMPLES 1–5 AND COMPARATIVE EXAMPLES 1–9

Tables 1 and 2 show influences of the relative viscosity in sulfuric acid of the polyamide (A) and the content of α,β-monounsaturated carboxylic acid in the total weight of the graft copolymer (B) and the carboxylic acid-modified copolymer (C) on the properties of the resin compositions.

EXAMPLES 6–9 AND COMPARATIVE EXAMPLE 10

Table 3 shows influence of the amount of the polyamide (A) on the properties of the resin compositions.

EXAMPLES 10–12 AND COMPARATIVE EXAMPLE 11

Table 4 shows influence of the amount of α,β-monounsaturated carboxylic acid in the carboxylic acid-modified copolymer (C) on the properties of the resin composition.

EXAMPLES 13–16

Table 5 shows possibility of the use of different kinds of graft copolymers.

EXAMPLES 17–20 AND COMPARATIVE EXAMPLES 12–15

Table 6 shows that the resin composition of the present invention has good properties when glass fibers are added to the composition.

TABLE 1

| | C1 | 1 | 2 | C2 | C3 | 3 | C4 | C5 | 4 | 5 | C6 | C7 | C8 | C9 |
|---|---|---|---|---|---|---|---|---|---|---|---|---|---|---|
| Composition (parts) | | | | | | | | | | | | | | |
| (A) Polyamide | | | | | | | | | | | | | | |
| ($\eta_r$ in H$_2$SO$_4$) | | | | | | | | | | | | | | |
| A-1 (1.8) | 50 | | | | | | | 50 | | | | | | |
| A-2 (2.4) | | 50 | | | | | | | 50 | | | 50 | | |
| A-3 (2.8) | | | 50 | | | | | | | 50 | | 50 | | 50 |
| A-4 (3.2) | | | | 50 | | | | | | | | | | |
| A-5 (3.5) | | | | | 50 | | | | | | 50 | | | |
| A-6 (2.6) | | | | | | 60 | | | | | | | | |
| A-7 (3.0) | | | | | | | 60 | | | | | | | |
| (B) Graft copolymer | | | | | | | | | | | | | | |
| B-1 | | | | | | 30 | 30 | | | | | | | |
| B-2 | 40 | 40 | 40 | 40 | 40 | | | 40 | 40 | 40 | 40 | 40 | 40 | 40 |
| (C) Carboxylic acid-modified copolymer | | | | | | | | | | | | | | |
| C-1 | | | | | | | | 8 | 8 | 5 | 5 | | | 10 |
| C-2 | 10 | 10 | 10 | 10 | 10 | 10 | 10 | 2 | 2 | 5 | 5 | | | |
| C-3 | | | | | | | | | | | | 10 | | |

TABLE 1-continued

| | Example No. | | | | | | | | | | | | | |
|---|---|---|---|---|---|---|---|---|---|---|---|---|---|---|
| | C1 | 1 | 2 | C2 | C3 | 3 | C4 | C5 | 4 | 5 | C6 | C7 | C8 | C9 |
| Composition (parts) | | | | | | | | | | | | | | |
| C-4 | | | | | | | | | | | | | 10 | |
| Content of unsaturated carboxylic acid in (B) + (C) | 1.0 | 1.0 | 1.0 | 1.0 | 1.0 | 1.25 | 1.25 | 0.2 | 0.2 | 0.5 | 0.5 | 2.0 | 3.0 | 0 |
| Content of rubbery polymer in the composition | 20 | 20 | 20 | 20 | 20 | 18 | 18 | 20 | 20 | 20 | 20 | 20 | 20 | 20 |

TABLE 2

| | Example No. | | | | | | | | | | | | | |
|---|---|---|---|---|---|---|---|---|---|---|---|---|---|---|
| | C1 | 1 | 2 | C2 | C3 | 3 | C4 | C5 | 4 | 5 | C6 | C7 | C8 | C9 |
| Notched Izod impact strength (kg cm/cm) | 72 | 82 | 87 | 89 | 95 | 70 | 71 | 64 | 73 | 72 | 89 | 71 | 81 | 8 |
| Flowability (cc/min) | 2.1 | 1.8 | 1.1 | 0.8 | 0.7 | 1.1 | 0.6 | 2.3 | 2.0 | 1.3 | 0.9 | 0.25 | 1.5 | 1.7 |
| Tensile strength (kg/cm$^2$) | 470 | 480 | 490 | 490 | 490 | 530 | 540 | 470 | 470 | 480 | 490 | 490 | 480 | 480 |
| Weld strength (kg/cm) | | | | | | | | | | | | | | |
| +23° C. | 250 | 750 | 725 | 250 | 225 | 550 | 250 | 250 | 750 | 700 | 250 | 225 | 400 | 100 |
| −30° C. | 75 | 200 | 175 | 75 | 75 | 225 | 100 | 75 | 200 | 175 | 75 | 50 | 100 | 50 |
| Appearance | O | O | O | O | O | O | O | O | O | O | O | Δ | X | O |

TABLE 3

| Example No. | C10 | 6 | 7 | 8 | 9 |
|---|---|---|---|---|---|
| Composition (parts) | | | | | |
| (A) Polyamide | | | | | |
| A-3 | 100 | 80 | 50 | 40 | 30 |
| (B) Graft copolymer | | | | | |
| B-1 | | 15 | | | |
| B-2 | | | 40 | 40 | 40 |
| (C) Carboxylic acid-modified copolymer | | | | | |
| C-1 | | | | 10 | 20 |
| C-2 | | 5 | 10 | 10 | 10 |
| Content of unsaturated carboxylic acid in (B) + (C) | 0 | 1.25 | 1.0 | 0.83 | 0.71 |
| Content of rubbery polymer in the composition | 0 | 9 | 20 | 20 | 20 |
| Properties | | | | | |
| Notched Izod impact strength (kg cm/cm) | 3.5 | 31 | 88 | 79 | 62 |
| Flowability (cc/min) | 5.7 | 3.5 | 1.5 | 1.1 | 0.7 |
| Tensile strength (kg/cm$^2$) | 700 | 630 | 480 | 460 | 440 |
| Weld strength (kg/cm) | | | | | |
| +23° C. | 850 | 800 | 750 | 650 | 350 |
| −30° C. | 300 | 250 | 225 | 200 | 175 |
| Appearance | O | O | O | O | Δ |

TABLE 4

| Example No. | 10 | 11 | 12 | C11 |
|---|---|---|---|---|
| Composition (parts) | | | | |
| (A) Polyamide | | | | |
| A-3 | 50 | 55 | 55 | 56 |
| (B) Graft copolymer | | | | |
| B-2 | 40 | 40 | 42 | 42 |
| (C) Carboxylic acid-modified copolymer | | | | |
| C-2 | 10 | | | |
| C-3 | | 5 | | |
| C-4 | | | 3 | |
| C-5 | | | | 2 |
| Content of unsaturated carboxylic acid in (B) + (C) | 1.0 | 1.1 | 1.0 | 1.1 |
| Content of rubbery polymer in the composition | 20 | 20 | 21 | 21 |
| Properties | | | | |
| Notched Izod impact strength (kg cm/cm) | 87 | 83 | 85 | 68 |
| Flowability (cc/min) | 1.1 | 0.95 | 0.90 | 0.45 |
| Tensile strength (kg/cm$^2$) | 470 | 480 | 460 | 460 |
| Weld strength (kg/cm) | | | | |
| +23° C. | 725 | 700 | 675 | 250 |
| −30° C. | 175 | 150 | 125 | 50 |
| Appearance | O | O | O | X |

TABLE 5

| Example No. | 13 | 14 | 15 | 16 |
|---|---|---|---|---|
| Composition (parts) | | | | |
| (A) Polyamide | | | | |
| A-3 | 50 | 50 | 45 | 45 |
| (B) Graft copolymer | | | | |
| B-3 | 42 | | 35 | |
| B-4 | | 42 | | 35 |
| (C) Carboxylic acid-modified copolymer | | | | |
| C-1 | | | 15 | 15 |
| C-2 | 8 | 8 | | |
| C-3 | | | 5 | 5 |
| Content of unsaturated carboxylic acid in (B) + (C) | 0.8 | 0.8 | 0.9 | 0.9 |
| Content of rubbery polymer in the composition | 21 | 21 | 17.5 | 17.5 |
| Properties | | | | |
| Notched Izod impact strength (kg cm/cm) | 97 | 102 | 88 | 90 |
| Flowability (cc/min) | 1.7 | 1.8 | 1.5 | 1.6 |
| Tensile strength (kg/cm$^2$) | 500 | 510 | 540 | 545 |
| Weld strength (kg/cm) | | | | |
| +23° C. | 750 | 775 | 725 | 750 |

TABLE 5-continued

| Example No. | 13 | 14 | 15 | 16 |
|---|---|---|---|---|
| −30° C. | 225 | 225 | 200 | 200 |
| Appearance | O | O | O | O |

TABLE 6

| | Example No. | | | | | | | |
|---|---|---|---|---|---|---|---|---|
| | 17 | C12 | 18 | C13 | 19 | C14 | 20 | C15 |
| Composition (parts) | | | | | | | | |
| (A) Polyamide | | | | | | | | |
| A-2 | 50 | 50 | 50 | 50 | 65 | 65 | 65 | 65 |
| (B) Graft copolymer | | | | | | | | |
| B-1 | | | | | 30 | 30 | 30 | 30 |
| B-2 | 40 | 40 | 40 | 40 | | | | |
| (C) Carboxylic acid-modified copolymer | | | | | | | | |
| C-1 | | 10 | | 10 | | 5 | | 5 |
| C-2 | 10 | | 10 | | 5 | | 5 | |
| Content of unsaturated carboxylic acid in (B) + (C) | 1.0 | 0 | 1.0 | 0 | 0.7 | 0 | 0.7 | 0 |
| Content of rubbery polymer in the composition | 20 | 20 | 20 | 20 | 18 | 18 | 18 | 18 |
| Weight ratio of Composition/glass fiber(*1) | 85/15 | 85/15 | 70/30 | 70/30 | 85/15 | 85/15 | 70/30 | 70/30 |
| Properties | | | | | | | | |
| Notched Izod impact strength (kg cm/cm) | 26 | 7 | 23 | 8 | 20 | 7 | 23 | 7 |
| Flowability (cc/min) | 1.5 | 2.0 | 1.2 | 1.5 | 1.6 | 2.5 | 1.3 | 1.5 |
| Tensile strength (kg/cm²) | 985 | 755 | 1245 | 840 | 1100 | 820 | 1455 | 1255 |
| Weld strength (kg/cm) | | | | | | | | |
| +23° C. | 125 | 50 | 100 | 25 | 100 | 50 | 75 | <25 |
| −30° C. | 75 | 25 | 50 | <25 | 75 | 25 | 50 | <25 |
| Appearance | O | O | Δ | Δ | O | O | Δ | Δ |
| Deformation temperature (°C.) | 125 | 130 | 180 | 180 | 138 | 140 | 210 | 210 |

Note:
(*1)Manufactured by Nitto Boseki Kabushikikaisha, 3PE-471 (cut length 3 mm, fiber diameter 10 μm).

What is claimed is:

1. A thermoplastic resin composition comprising:
(A) polyamide having a relative viscosity in sulfuric acid of not less than 2.0 and less than 3.0,
(B) a graft copolymer which is obtainable by copolymerizing 50 to 90% by weight of an aromatic vinyl monomer, 10 to 50% by weight of an unsaturated nitrile monomer and 0 to 40% by weight of at least one monomer selected from the group consisting of alkyl esters of unsaturated carboxylic acids and maleimide compounds in the presence of a rubber polymer and
(C) a carboxylic acid-modified copolymer consisting essentially of monomeric units derived from 50 to 89.5% by weight of an aromatic vinyl monomer, 10 to 49.5% by weight of an unsaturated nitrile monomer and 0.5 to 20% by weight of an α,β-unsaturated monocarboxylic acid,
wherein the weight ratio of polyamide (A) to the total amount of the graft copolymer (B) and the carboxylic acid-modified copolymer (C) is from 90:10 to 10:90, the content of α,β-unsaturated monocarboxylic acid is 0.1 to 1.5% by weight based on the total amount of the graft copolymer (B) and the carboxylic acid-modified copolymer (C), and the content of the rubbery polymer is 5 to 30% by weight based on the whole weight of the composition.

2. The thermoplastic resin according to claim 1, wherein the weight ratio of polyamide (A) to the total amount of the graft copolymer (B) and the carboxylic acid-modified copolymer (C) is from 90:10 to 30:70.

3. The thermoplastic resin according to claim 1 wherein (B) is a graft copolymer which is obtainable by copolymerizing 50 to 90% by weight of styrene and 10 to 50% by weight of acrylonitrile in the presence of a rubbery polymer and (C) is a carboxylic acid-modified copolymer consisting essentially of monomeric units derived from 50 to 89.5% by weight of styrene, 10 to 49.5% by weight of acrylonitrile and 0.5 to 20% by weight of methacrylic acid.

4. The thermoplastic resin according to claim 3 wherein the polyamide is selected from the group consisting of nylon 6 and nylon 66 and said rubbery polymer is selected from the group consisting of polybutadiene, polybutylacrylate and ethylene-propylene-non-conjugated diene copolymer.

* * * * *